United States Patent [19]

Hellström

[11] Patent Number: 4,714,329

[45] Date of Patent: Dec. 22, 1987

[54] VISUAL AID ESPECIALLY FOR WEAK-SIGHTED PERSONS

[75] Inventor: Lars Hellström, Mölndal, Sweden

[73] Assignee: N.V. Optimed, Izegem, Belgium

[21] Appl. No.: 785,252

[22] Filed: Oct. 7, 1985

[30] Foreign Application Priority Data

Oct. 9, 1984 [SE] Sweden .................. 8405034

[51] Int. Cl.⁴ .................. G02C 1/00; G02B 25/00
[52] U.S. Cl. .................. 351/158; 351/159; 351/173; 350/146
[58] Field of Search .................. 351/158, 159, 173, 41; 350/146

[56] References Cited

U.S. PATENT DOCUMENTS 3,369,228  2/1968  Foster .................. 351/158
4,540,238  9/1985  Edwards .................. 351/158

Primary Examiner—Rodney B. Bovernick
Assistant Examiner—P. M. Dzierzynski
Attorney, Agent, or Firm—Cushman, Darby & Cushman

[57] ABSTRACT

Visual aid especially for weak-sighted persons and comprising a sleeve into which at least one lens is fittable having the desired optical properties. The sleeve is intended to be fitted into an opening in a spectacle glass and be fixed in an optional position for individual adjustment of the distance between the person's cornea and the lens surface.

4 Claims, 3 Drawing Figures

VISUAL AID ESPECIALLY FOR WEAK-SIGHTED PERSONS

Persons having a strongly reduced ability to see need powerful binocular magnifying glasses for close seeing, e.g. reading. Besides a number of other corrections can be necessary, e.g. cylindric correction, prismatic effect, etc. The visual aids which up to now have been available for this category of patients are relatively costly, as they have to be specially made after the individual requirements of the optical characteristics of the lens as well as of the distance between the cornea and the lens surface.

The object of the present invention is to provide a flexible and less costly visual aid, which meets high requirements for individual adjustment as well as ease with which it can be handled. This has been achieved by the fact that it comprises a sleeve into which at least one lens is fittable having the desired optical properties, and a pair of spectacles in which the spectacle glass has an opening corresponding to the sleeve and into which the sleeve can be fitted and fixed in an optional position for individual adjustment of the distance between the person's cornea and the lens surface.

The invention will now be closer described with reference to an embodiment shown in the accompanying drawing.

Figure 1:
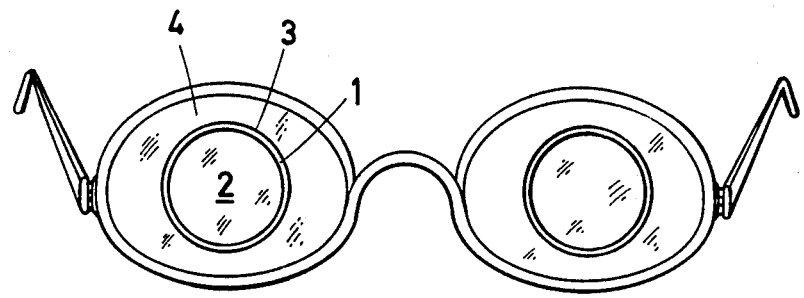
FIG. 1 shows a pair of spectacles provided with the visual aid according to the invention.
Figure 2:
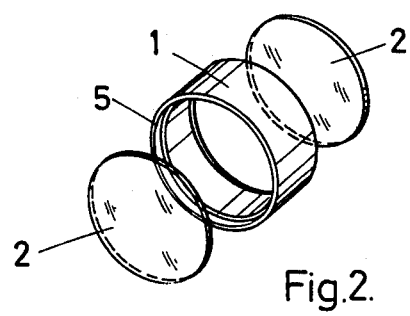
FIG. 2 shows the sleeve and a pair of lenses intended to be fixed in the sleeve.
Figure 3:
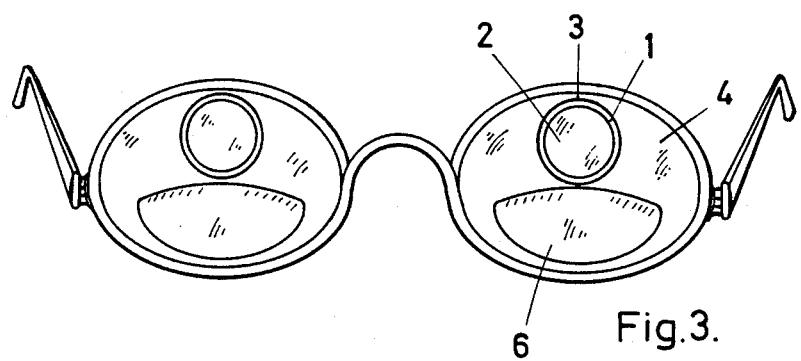
FIG. 3 shows a pair of spectacles which besides the aid according to the present invention also is provided with a distance alt. reading segment.

The visual aid comprises a substantially cylindric sleeve 1 in which one or possibly two lenses 2 can be fitted, one at each end of the sleeve. The device can be compared with a magnifying glass, which held close to the eye gives a magnified image of an object which is held just in front of the lens.

The sleeve 1 is intended to be fitted into a cut opening 3 in a spectacle glass 4, at which its position can be adjusted for individual adaptation of the distance between the patient's cornea and the lens surface. After this adjustment the sleeve is preferably fixed to the spectacle glass 4, e.g. by gluing.

The sleeve 1 is preferably on its inside at both ends provided with a groove 5, in which the lens 2 can be snap-locked. Thus the lens 2 needs not be secured by screws. The lens can easily be removed from the sleeve 1 by means of a suction cup.

The opening 3 in the spectacle glass 4 can either be arranged centrally therein, as is shown in FIG. 1, which is preferred if the spectacles are intended to be used only for close seeing, e.g. reading. If the spectacles are to be used both for distance and close seeing the opening 3 and the sleeve 1 respectively are made smaller and are preferably placed in the upper part of the spectacles, as the patient at reading must hold the text in front of him very close to the eyes. The spectacle glass is at its lower part provided with a distance segment 6. It is of course also possible to place the distance segment on the upper part and the lens performing the function of a reading portion at the lower part of the spectacle glass.

It is obvious that this system offers a great flexibility and good possibilities to combinations. One lens can e.g. provide a spherical correction while the other lens provides the desired cylindrical correction. The lenses may also be given a prismatic effect, which influences the optical centre at close seeing and which is required for correction of certain visual defects.

The system may also be used at the performance of precision works, e.g. goldsmith's work, in order to provide a binocular vision with magnification.

The invention is of course not limited to the embodiments shown but a plurality of modifications are possible within the scope of the claims. It is e.g. obvious that the sleeve can have othr geometric shapes than cylindric.

I claim:

1. A visual aid for a particular weak-sighted person to improve the vision of the person, comprising a pair of spectacle glasses, having a spectacle glass positioned in front of each eye, to be worn by the weak-sighted person as a vision aid, each spectacle glass having an opening therein, the shape of which matches the exterior shape of a sleeve, into which sleeve at least one lens is interchangeably fitted having particular desirable optical properties for the particular eye in front on which the sleeve and lens are positioned in the spectacle glass, said at least one lens being interchangeable with other lenses to compensate for changes in the desirable optical properties for the particular eye, and the position of each sleeve in each spectacle glass being adjustable by sliding of the sleeve within its corresponding opening until a particular desirable ophthalmic position of the sleeve in front of the eye is selected, at which the sleeve is positioned within its corresponding opening in the spectacle glass such that the visual aid can be adjusted to improve the vision of the person by changing lenses and also by adjustably sliding and positioning the sleeve in its corresponding opening.

2. A visual aid according to claim 1, characterized in that the sleeve is provided with means for snap-locking the lens to the sleeve.

3. A visual aid according to claim 1, each sleeve being fixedly fastened within its corresponding opening in a spectacle glass by glue after the position of the sleeve is adjusted to achieve a desired optical property.

4. A visual aid according to claim 1, each sleeve having a cylindrical housing, and each corresponding opening in a spectacle glass having a circular opening therein corresponding in size to the cylindrial housing.